Nov. 9, 1948.   J. L. PERKINS   2,453,586
DRIVE MECHANISM
Filed Sept. 27, 1945

INVENTOR.
Julian L. Perkins.
BY Walter P. Ross.
Attorney

Patented Nov. 9, 1948

2,453,586

UNITED STATES PATENT OFFICE 2,453,586

DRIVE MECHANISM

Julian L. Perkins, West Springfield, Mass., assignor, by mesne assignments, to The Gordon Armstrong Company, Inc., Cleveland, Ohio, a corporation of Ohio Application September 27, 1945, Serial No. 618,845

2 Claims. (Cl. 74—70)

This invention relates to improvements in driving mechanism and is directed more particularly to improvements to driven mechanism wherein a rotating motion is transformed into an oscillating motion.

The novel features of the invention are directed to a driving mechanism which is simple in construction and compact in form facilitating economy in manufacture and occupying small space.

The mechanism of the invention is adapted for many and various uses but is particularly adapted for use in connection with a washing machine which has an oscillatable agitator shaft and a rotatable wringer shaft.

Figure 1:
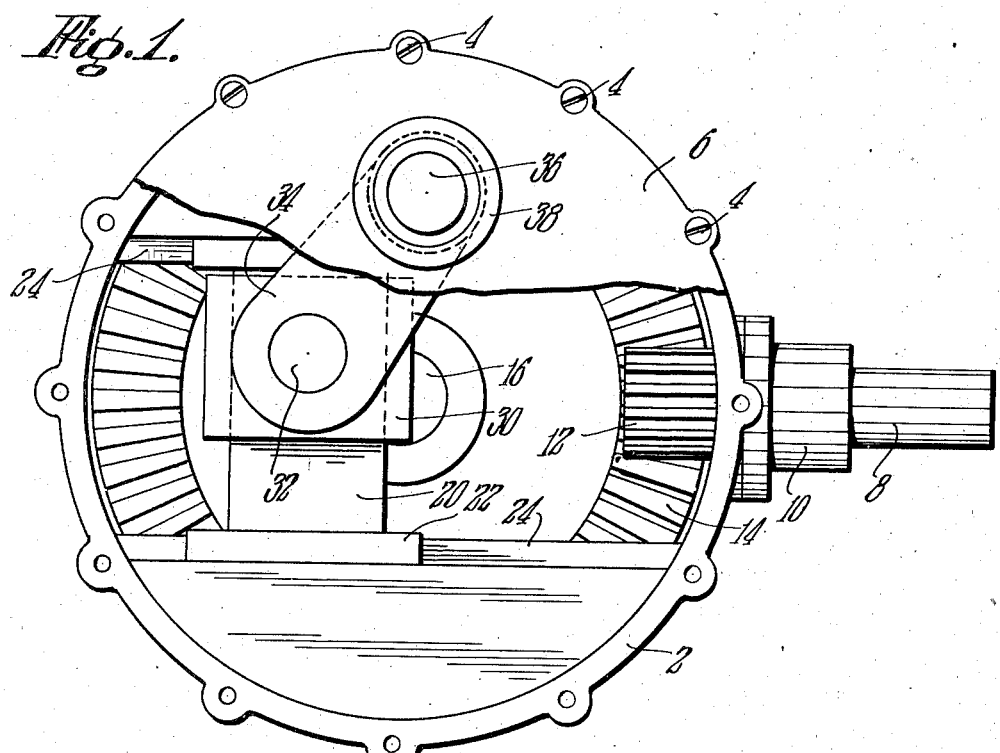
Figure 2:
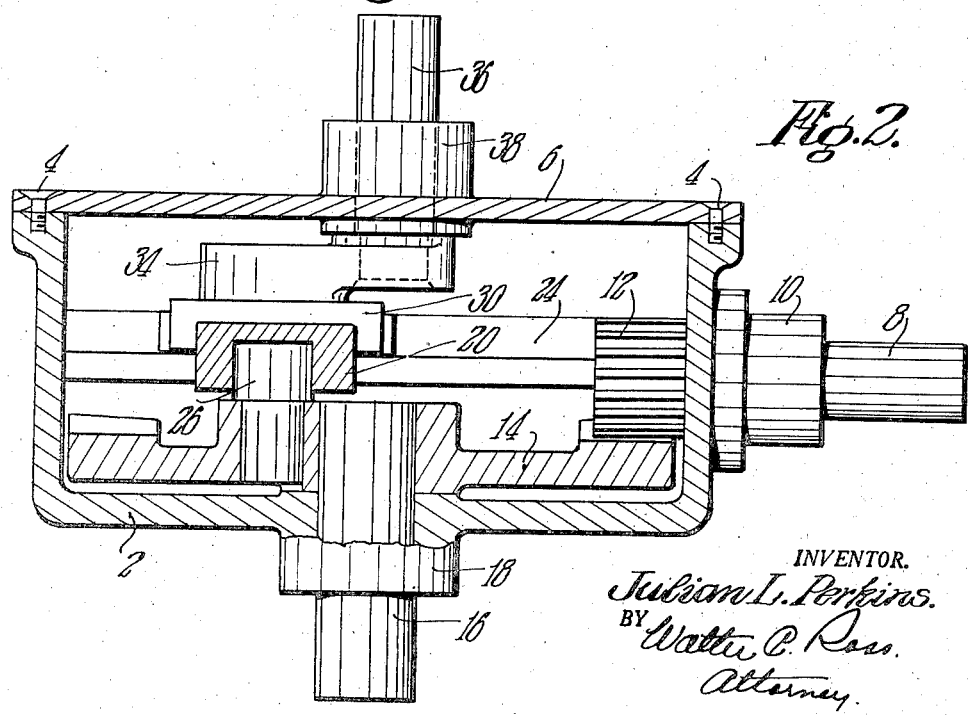

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a driving mechanism embodying the novel features of the invention; and Fig. 2 is a transverse sectional view of the mechanism shown in Fig. 1.

Referring now to the drawings more in detail, the invention will be fully described.

A housing 2 is provided to which is secured as by screws 4, or the like, a cover 6 so as to provide a non-leakable compartment for lubricant.

A drive shaft 8 is journalled for rotation in a bearing structure 10 associated with the housing. This shaft may be driven by any means desired and it carries a driving pinion 12.

A face gear 14 has its teeth in mesh with the pinion 12 and has a shaft 16 rotatably journalled in a bearing structure 18.

A slide 20 has opposite ends 22 slidably guided in spaced guideways 24. A pin 26 carried by the gear 14 is disposed in a slot provided in the lower side of the slide 20. As the gear 14 is rotated by the pinion 12 the pin 26 of said gear moves the slide 20 back and forth relative to the guideways 24.

A block 30 is slidable on the slide 20 in a direction opposed to the direction of movement of the said slide and it has a stud 32 journalled therein with which is associated a lever 34.

A shaft 36 carried in the outer end of lever 34 is journalled for oscillating in a bearing construction 38 of the cover 6.

As the shaft 8 is driven from some suitable source of power the gear 14 is rotated by the pinion 12 whereby the slide 20 is reciprocated back and forth. The oscillatable shaft 36 being journalled in the bearing 38 of the cover and the end of the lever 34 associated therewith being pivotally connected to the block 30 said block is moved back and forth on the slide so that the shaft 36 is given an oscillating movement.

The said shaft 36 may be connected to the agitator or agitator shaft of a washing machine while the shaft 16 may be connected to the wringer shaft thereof whereby both shafts are operated as the driving shaft 8 is rotated.

The parts may be constructed and arranged so that the shaft 36 may be oscillated through any angle desired and anti-friction means may be employed for any of the shafts if desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A driving mechanism of the class described comprising in combination, a casing, a drive shaft and a rotatable driven shaft journalled therein, gears fixed to said shafts in meshing engagement, a slide guided for reciprocation in said casing, a block slidable on said slide, an oscillatable shaft journalled in said casing, operative connections between said block and oscillatable shaft and between said slide and one of said gears.

2. A driving mechanism of the class described comprising in combination, a casing, a drive shaft and a driven shaft journalled therein, intermeshing gears fixed to said shafts, a slide guided for reciprocation in said casing, a block slidable on said slide, means carried by one of said gears engaging said slide whereby it is reciprocated by said gear, an oscillatable shaft journalled in said casing, and a crank fixed to said oscillatable shaft at one end and pivoted to said block at its other end whereby as the slide is reciprocated in opposite directions the block is reciprocated in directions opposite thereto to oscillate said oscillatable shaft.

JULIAN L. PERKINS.

REFERENCES CITED

The following references are of record in the file of this patent:

UNITED STATES PATENTS

| Number | Name | Date |
|---|---|---|
| 956,822 | Parsons | May 3, 1910 |